US008572713B2

(12) United States Patent
Buer (10) Patent No.: US 8,572,713 B2
(45) Date of Patent: *Oct. 29, 2013

(54) UNIVERSAL AUTHENTICATION TOKEN (75) Inventor: Mark Buer, Gilbert, AZ (US)

(73) Assignee: Broadcom Corporation, Irvine, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/434,628

(22) Filed: Mar. 29, 2012

(65) Prior Publication Data

US 2012/0185697 A1 Jul. 19, 2012

Related U.S. Application Data

(63) Continuation of application No. 11/599,323, filed on Nov. 15, 2006, now Pat. No. 8,171,531.

(60) Provisional application No. 60/737,660, filed on Nov. 16, 2005.

(51) Int. Cl.
*G06F 21/00* (2013.01)

(52) U.S. Cl.
USPC .............................. 726/9; 713/172; 713/185

(58) Field of Classification Search
None
See application file for complete search history.

(56) References Cited

U.S. PATENT DOCUMENTS

| 5,534,857 | A | 7/1996 | Laing et al. |
| 6,263,446 | B1 | 7/2001 | Kausik et al. |
| 6,655,585 | B2 | 12/2003 | Shinn |
| 7,360,238 | B2 | 4/2008 | Owlett |
| 2003/0140228 | A1 | 7/2003 | Binder |
| 2004/0215964 | A1 | 10/2004 | Barlow et al. |
| 2005/0005128 | A1* | 1/2005 | Lambert et al. ............... 713/182 |
| 2007/0028118 | A1 | 2/2007 | Brown et al. |
| 2007/0118891 | A1 | 5/2007 | Buer |

* cited by examiner

*Primary Examiner* — Gilberto Barron, Jr.
*Assistant Examiner* — Izunna Okeke
(74) *Attorney, Agent, or Firm* — Sterne, Kessler, Goldstein & Fox P.L.L.C.

(57) ABSTRACT

A universal authentication token is configured to securely acquire security credentials from other authentication tokens and/or devices. In this manner, a single universal authentication token can store the authentication credentials required to access a variety of resources, services and applications for a user. The universal authentication token includes a user interface, memory for storing a plurality of authentication records for a user, and a secure processor. The secure processor provides the required cryptographic operations to encrypt, decrypt, and/or authenticate data that is sent or received by universal token. For example, secure processor may be used to generate authentication data from seed information stored in memory.

20 Claims, 6 Drawing Sheets

UNIVERSAL AUTHENTICATION TOKEN

CROSS-REFERENCE TO RELATED APPLICATIONS

This application is a continuation of U.S. patent application Ser. No. 11/599,323, filed Nov. 15, 2006, which claims the benefit of U.S. Provisional Application No. 60/737,660, filed Nov. 16, 2005, all of which are herein incorporated by reference in their entireties.

FIELD OF THE INVENTION

This application relates generally to data communications and more specifically to information security.

BACKGROUND OF THE INVENTION

Many service or application providers require a user to present authentication information in order to gain access to a specific service or application. For example, an employer may require an employee to enter a one-time password to access computer resources remotely. In a further example, the provider of on-line financial services may require users to enter authentication data to gain access to financial information or perform transactions. In addition, a token may be required to gain physical access to a building or a location within a building.

Authentication factors for individuals are generally categorized in three classes: something the user is (e.g., a biometric such as a fingerprint), something the user has (e.g., a security token), and something the user knows (e.g., a password). Many sensitive services and applications require multi-factor authentication. That is, a user must provide multiple authenticators in order to gain access to a resource, service, and/or application.

A typical security token uses a symmetric cryptography algorithm to provide authentication credentials. For example, the token and the verifying entity (e.g., a network server or building access controller) may both maintain or generate the same value (e.g., using a particular algorithm and seed).

Because of the need for strong security, an individual may have multiple security tokens. For example, a user may have a security token which generates a code to enable the individual to gain access to a building via an entry security system. The same individual may have a separate token to generate passwords that enable the individual to access his company's computer resources and another token to generate security credentials to enable the access to on-line financial account information.

Requiring a separate token for multiple services is inconvenient for users and increases the likelihood that a user will not fully utilize a service or application. In addition, increasing the security burden on a user often results in the user handling the one or more tokens in an insecure manner or developing mechanisms to avoid or bypass security all together.

What is therefore needed is a universal authentication token which can import and store authentication data from other authentication tokens.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will now be described with reference to the accompanying drawings. In the drawings, like reference numbers can indicate identical or functionally similar elements. Additionally, the left-most digit(s) of a reference number may identify the drawing in which the reference number first appears.

DETAILED DESCRIPTION OF THE INVENTION

A universal authentication token is configured to securely acquire security credentials from other authentication tokens and/or devices. In this manner, a single universal authentication token can store the authentication credentials required to access a variety of resources, services and applications for a user. For example, a single universal authentication token may be used to access a data network, gain access to financial information such as an on-line financial account, gain access to a building, perform a transaction (e.g., using a credit card number or information used by a smartcard), gain access to a local computing device, or to perform other authentication operations that may use, for example, authentication credentials such as one-time passwords, HID codes, etc.

Figure 1:
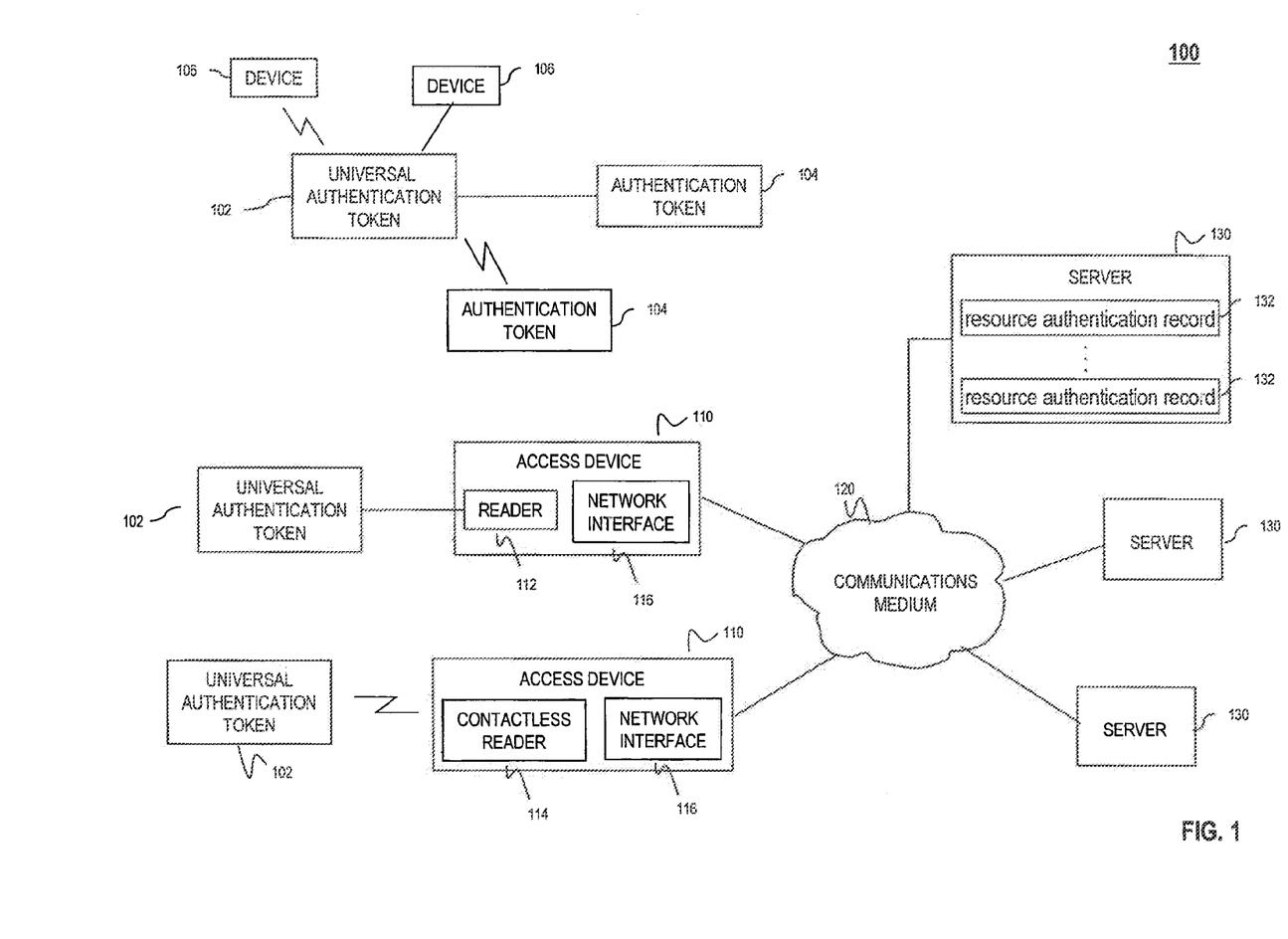
FIG. 1 is an exemplary operating environment for the use and provisioning of universal authentication tokens, according to embodiments of the present invention.

FIG. 1 is an exemplary operating environment 100 for the use and provisioning of universal authentication tokens, according to embodiments of the present invention. Exemplary operating environment 100 includes a plurality of universal authentication tokens 102 (referred to herein as "universal tokens"), one or more authentication tokens 104, one or more devices 106 storing authentication data, one or more access devices 110, a communications network 120, and one or more servers 130.

Server 130 hosts one or more resources, applications, and/or services to which a user is enrolled. Server 130 includes one or more resources, applications, and/or services (not shown) and one or more authentication records 132 associated with each resource. A server may comprise hardware and/or software configured to provide a resource, service, or application. For example, a server may include a processing system that handles access requests, authenticates the requestor, and facilitates access to the requested resource, service, or application.

A user enrolls with a service provider, employer, building owner, etc. (collectively referred to herein as "provider" for ease of description) for access to a specific resource, service, application, or physical location (collectively referred to herein as "resource" for ease of description). After performing verification and authentication of the user, the provider issues an authentication token 104, device 106, or data file including the authentication data required for future access to the resource. In addition to issuing the authentication mechanism, the service provider stores an identifier for the user and his/her associated authentication data in the authentication record 132 for the resource.

Access device 110 includes a reader 112 and a network interface 116. Reader 112 is configured to communicate with a universal token 102 and/or authentication tokens 104. Specifically, reader 112 is configured to receive (i.e., read) data stored on universal token 102. In an embodiment, reader 112 is a contact-based reader. In a contact-based reader, the reader has one or more electrical connectors which make contact with electrical connectors on universal token 102. An example of a contact-based reader is a smart card reader in which the smart card must be inserted into a slot to establish connection between the chip on the card and the reader.

In addition or alternatively, access device 110 may include a contactless reader 114. A contactless reader 114 communicates with a universal token 102 wirelessly. For example, the contactless reader 114 may communicate with a universal token 102 using radio frequency identification (RFID) induction technology, low frequency RFID, or near field communication (NFC) such as high frequency RFID, ISO 14443 and ISO 15693).

In an embodiment, access devices 110 directly access one or more servers 130 via a communications medium 120. Communications medium 120 may be a public data communications network such as the Internet, a private data communications network, the Public Switched Telephone Network (PSTN), a wireless communications network, or any combination thereof. The interface between access devices 110 and communications network 120 and the interface between servers 130 and communications network 120 can be a wireless interface or a wired interface.

Universal authentication token 102 is any user device which can import and store authentication information for multiple resources, applications and/or services including, but not limited to, a fob, dongle, smart card, building access card, badge, or other form of easy to carry article. In addition, universal authentication token 102 can be embedded in a device such as a wireless phone, a personal digital assistance (PDA), a personal entertainment device (PED) or personal computer. A universal token 102 may be implemented in various physical forms depending upon the needs of the respective application. For example, universal token 102 may be circuitry embedded in a small plastic (or other material) case.

In an embodiment, universal token 102 is used in combination with an access device 110 to access a resource provided on a server or other computing device. In addition or alternatively, universal token 102 may display a password which is then entered by a user into a computing device to gain access to the resource.

Authentication token 104 is a user device which stores authentication information for one or more resources, applications, or services. Unlike universal token 102, authentication token 104 is not configured to import authentication data from other tokens or devices.

Device 106 is any device which stores authentication information for one or more resources, applications, or services. In an embodiment, device 106 is not portable. For example, device 106 may be a computer system which issues authentication data for a resource, service, or application.

Universal token 102 is configured to communicate with authentication tokens 104 or devices 106 to obtain authentication data stored on the tokens 104 and/or devices 106. Universal token 102 may also communicate with other universal tokens 102 to obtain authentication data. The capability to securely communicate with other authentication tokens 104 or devices 106 allows for the consolidation of authentication data for a variety of resources, applications, and/or services onto a single universal token 102. In an embodiment, universal token 102 communicates with authentication tokens 104 and/or devices 106 via a wireless interface including, but not limited to, RF interfaces, optical interfaces, RF interfaces, or the like. In addition or alternatively, universal token 102 communicates with authentication tokens 104 and/or devices 106 via a wired connection.

Figure 2:
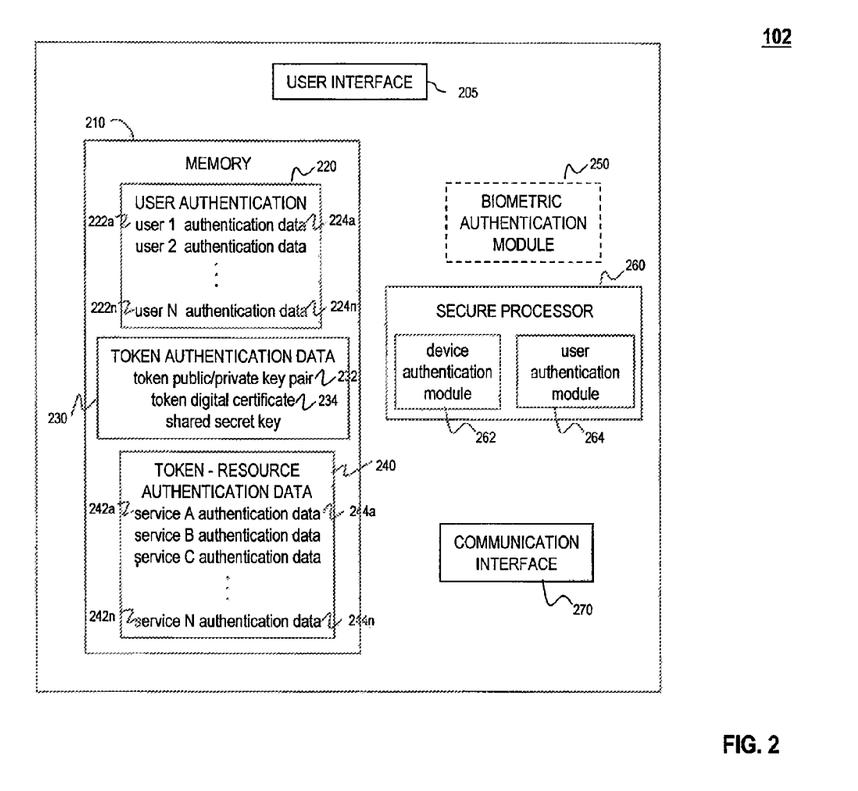
FIG. 2 depicts a block diagram of an exemplary universal authentication token, according to embodiments of the present invention.

FIG. 2 depicts a block diagram of an exemplary universal authentication token 102, according to embodiments of the present invention. Universal token 102 includes a user interface 205, memory 210, optional biometric authentication interface 250, secure processor 260, and communications interface 270.

User interface 205 is configured to enable a user to interact with universal token 102. User interface 205 may include one or more output devices including, but not limited to, a display, indication lights, and a speaker. In addition, user interface 205 may include one or more input devices including, but not limited to, a keypad, button, pointing device, touch screen, audio device, and/or soft-key-based menu.

Secure processor 260 provides the required cryptographic operations to encrypt, decrypt, and/or authenticate data that is sent or received by universal token 102. For example, secure processor 260 may be used to generate authentication data from seed information stored in memory 210. Secure processor 260 may comprise a processor, memory, dedicated cryptographic hardware. In addition, secure processor 260 may incorporate other security mechanisms. In an embodiment, secure processor 260 is designed to conform to a security specification relating to, for example, FPS or TPM. In an embodiment, secure processor 260 includes a device authentication module 262 and a user authentication module 264.

A security boundary associated with secure processor 260 may be established, for example, using hardware and/or cryptographic techniques. Hardware techniques for providing a security boundary may include, for example, placing components within a single integrated circuit. In addition, one or more integrated circuits may be protected by a physical structure using tamper evident and/or tamper resistant techniques such as epoxy encapsulation. Encryption techniques for establishing a security boundary may include, for example, encrypting sensitive information before it leaves secure processor 260. For this purpose, secure processor 260 may use one or more cryptographic processors and store the associated encryption/decryption keys in a secure memory internal to secure processor 260.

In an embodiment, secure processor 260 includes the capabilities to generate an asymmetric key pair (public/private key pair). In an alternative embodiment, the private key is "securely injected" into the secure processor 260. In the secure injection embodiment, the entity which injects the private key must "forget" the private key to ensure the integrity and privacy of the asymmetric key pair. In either embodiment, the private key does not leave the hardware security boundary of processor 260 unless encrypted. An exemplary system and process for securely generating an asymmetric key pair or securely injecting a private key into a processor is described in detail in U.S. Patent Publication No. 2005/0166051, entitled "System and Method for Certification of a Secure Platform," which is incorporated herein by reference in its entirety.

Biometric authentication module 250 includes a biometric scanner and/or software to convert the scanned biometric data into a biometric template. In an embodiment, biometric authentication module 250 also includes functionality to authenticate a user. Biometric authentication module 250 is optional. When present, biometric authentication may be used to control access to the universal token 102. In addition or alternatively, biometric authentication may be used to authenticate a user to an authentication token 104 or device 106 or to provide an addition authentication factor to server 130. In an embodiment, biometric authentication module 250 includes a fingerprint reader or fingerprint scanner. In an embodiment, all or a portion of the biometric authentication module 250 is included within the security boundary of secure processor 260.

Memory 210 is configured to store authentication data and/or data that may be used to generate authentication data (collectively referred to herein as "authentication data" for ease of description). For example, memory 210 may store user authentication data 220, token authentication data 230, and token-resource authentication data 240. In an embodiment, a portion of this information is stored in a security boundary associated with secure processor 260. Memory 210 may include RAM, ROM, flash memory, one-time-programmable (OTP) memory or other types of data storage devices.

User authentication data 220 includes data for authenticating a user of universal token 102. Universal token 102 may be provisioned for multiple users. User authentication data 220 includes one or more user authentication records, each having a user identifier 222 and associated authentication data 224. Note that the user identifier may not be present if universal token 102 is provisioned for a single user. In an embodiment, user authentication data 220 is stored within the security boundary defined by the secure processor 260. User authentication data 220 may be a shared secret, a password, or a PIN.

In an embodiment, user authentication data 224 is a biometric template such as a fingerprint template. For example, when universal token 102 is first initialized for a user, the token 102 may take a biometric scan of the user via biometric authentication interface 250. The biometric authentication interface 250 then converts the scan data into a format efficient for storage as user authentication data 224 (e.g., a biometric template). Subsequently, the universal token 102 performs a biometric scan of a potential user. The secure processor 260 may then determine whether the received biometric template matches the biometric template stored for the user in memory 210 (i.e., user authentication data 224). If a match is confirmed, the user is allowed access to the functionality provided by universal token 102.

Token authentication data 230 includes data to authenticate the universal token 102 to other tokens and/or devices. Token authentication data 230 includes a public/private key pair 232 assigned to the token and a digital certificate 234 for the token. In an embodiment, token authentication data 230 may include one or more secret keys or other form of secret shared between the token and another device. As described above, the private key, secret keys, and/or shared secrets may be stored within the security boundary defined by the secure processor 260.

Digital certificate 234 includes the public key of the universal token 102, a name or other identifier for the universal token, an expiration date, serial number, and identification of the organization which issued the certificate. In addition, the digital certificate 234 may include an indication of the security level of the universal token. The certification authority signs the digital certificate using its private key.

Digital certificate 234 may be generated at the time of manufacture of the device or when the universal token 102 is configured for use. As would be appreciated by a person of skill in the art, any procedure for generating a digital certificate can be used. In an illustrative example, the universal token 102 initiates a key enrollment process with a certification authority. During the enrollment process, the universal token 102 communicates its public key and optionally identifying information. The certification authority then authenticates the identity of the universal token 102. The verification process can be performed in a variety of ways. For example, when the public/private key pair was generated, processor 260 may share the public key, via a secure communication link, with a warranty server. In this example, the certification authority may query the warranty server to validate that the received public key is a valid public key for the universal token 102. In addition or alternatively, the certification authority may validate the identification information provided by the universal token 102.

After the certification authority has authenticated the identity of universal token 102, the certification authority issues a digital certificate for universal token 102. As would be recognized by persons of skill in the art, any technique for generating a signed certificate can be used with the present invention. Note that the public key of the certification authority must be publicly available to enable validation of the universal token digital certificate 234.

Token-resource authentication data 240 includes authentication data records for each resource, service, application, and/or physical location to which the user is authorized to access. Token-resource authentication data 240 includes a plurality of token-resource authentication records. Each record includes a resource identifier 242 and its associated authentication data 244. Note that if universal token 102 supports multiple users, each record may also include a user identification field.

Individual records in token-resource authentication data 240 may include different information or have different formats, etc. The type and format of the authentication data stored for a resource is dependent upon the authentication algorithm and/or method utilized for the resource. In addition, authentication data may store an authentication algorithm (e.g., symmetric algorithm) or a pointer to an algorithm stored elsewhere in universal token 102 (e.g., within secure processor 260). Universal token 102 is configured to store multiple types and formats for authentication data.

Communications interface 270 is configured to provide an interface for communication with authentication tokens 104, devices 106, and/or access devices 110. Communications interface 270 may include multiple separate interfaces. In an embodiment, communications interface 270 includes a contactless or wireless interface. In addition or alternatively, communications interface 270 includes a contact-based or wired interface. In an embodiment, the communications interface 270 used to transfer information between authentication tokens 104/devices 106 and universal token 102 is also used to transfer information with an access device 110.

Figure 3:
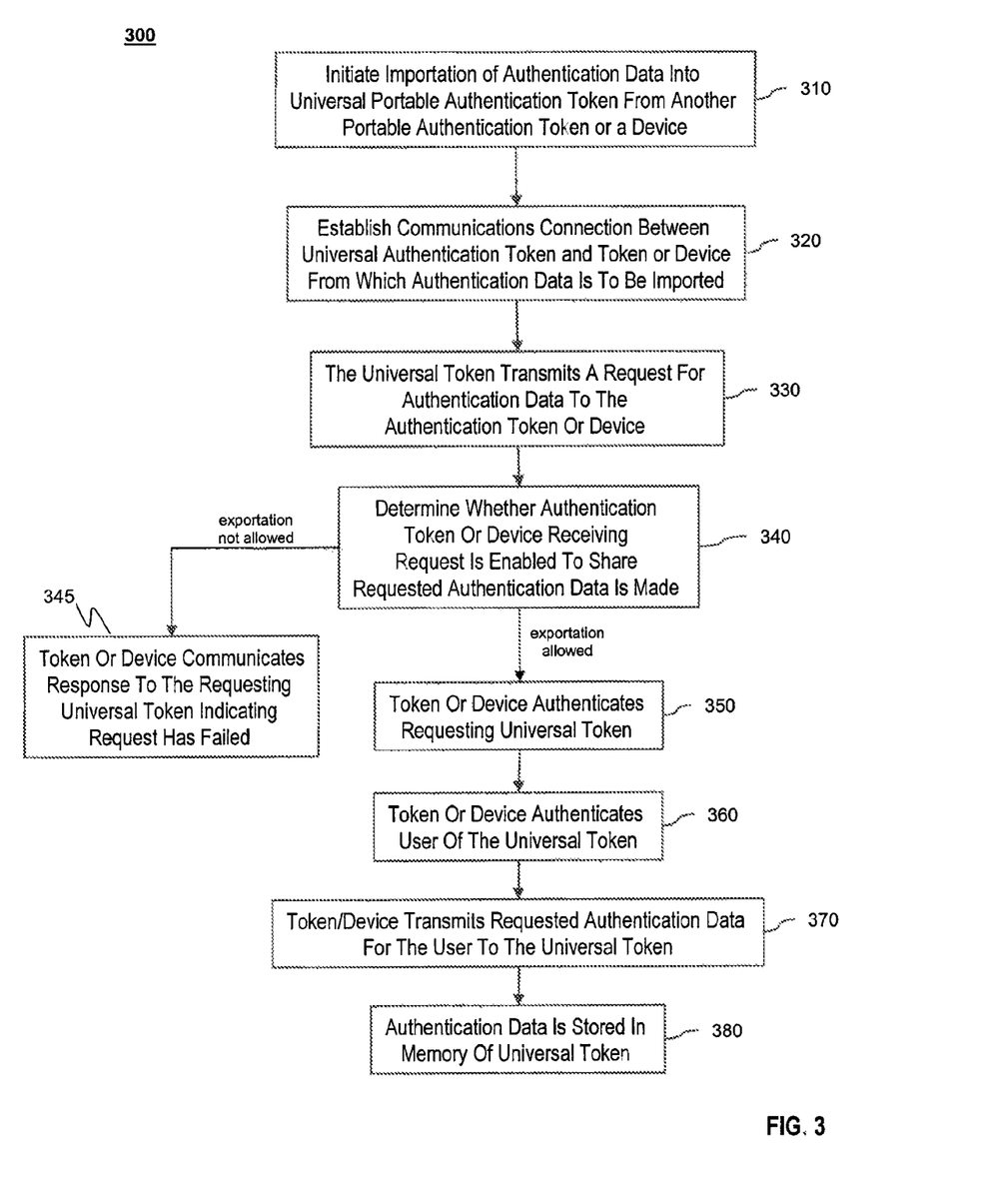
FIG. 3 depicts a flowchart of a method for provisioning a universal authentication token, according to embodiments of the present invention.

FIG. 3 depicts a flowchart 300 of a method for provisioning a universal authentication token, according to embodiments of the present invention. Through the provisioning method, authentication data stored in an authentication token 104 or device 106 is transferred to the universal token 106. Flowchart 300 is described with continued reference to the exemplary operating environment depicted in FIG. 1 and the exemplary universal authentication token depicted in FIG. 2. However, flowchart 300 is not limited to these embodiments.

Note that some of the steps in flowchart 300 do not necessarily have to occur in the order shown.

Prior to step 310, a user enrolls with a service provider, employer, building owner, etc. (referred to herein as "provider" for ease of description) for access to a specific resource, service, application, or physical location (referred to herein as "resource" for ease of description). After performing verification and authentication of the user, the provider issues an authentication token 104, device 106, or data file including the authentication data required for future access to the resource. In addition, to issuing the authentication mechanism the service provider enrolls an identifier for the user and his/her associated authentication data in an authentication record for the resource in a server hosting the resource. As a result, a user may have multiple separate authentication tokens 104 and/or authentication devices 106. FIG. 3 provides a method for consolidating the authentication data from the multiple tokens/devices into a single universal authentication token 102.

In step 310, the importation of authentication data into the universal authentication token 102 from another authentication token 104 or device 106 storing authentication data for a user is initiated. In an embodiment, a user activates a button incorporated into the housing of the universal authentication token or a button, link, or similar mechanism displayed on a menu of the universal authentication token to initiate data importation.

As part of step 310 or prior to step 310, universal token 102 is brought into communication contact with the token 104 or device 106 from which data is to be imported. For example, universal token 102 may be placed proximate to a an authentication token 104 or device 106 to enable wireless communication between universal token 102 and token 104/device 106. In a further example, universal token 102 is physically coupled to an authentication token 104 or device 106 via a connector.

In step 320, a communications connection is established between the universal token 102 and token 104/device 106 from which authentication data is to be imported. The details of the establishment of the communication connection are dependent upon the protocol used for communication. In an embodiment, a secure session is established during step 320. Alternatively, an insecure session may be first established and a secure session established at some later stage of the process, for example, before sensitive information is transmitted.

In step 330, universal token 102 transmits a request for authentication data to the authentication token 104/device 106. The request identifies at least one resource for which authentication data is requested. In an embodiment, the authentication data stored in an authentication token 104/device 106 is associated with a user identifier. In this embodiment, the request from the universal token 102 also includes an identification of the user. In addition, the request may include information to authenticate the universal token 102 such as the digital certificate for the universal token 102.

In step 340, a determination of whether the authentication token 104/device 106 receiving the request is enabled to share the requested authentication data is made. This step is optional 340. In an embodiment, a flag or similar parameter is set to indicate whether the token 104/device 106 is authorized to export stored authentication data. The flag or parameter may be set by the user of the token 104/device 106. Alternatively, the flag or parameter may be set at the time of manufacture or configuration of the token 104/device 106. If the flag or parameter indicates that exportation is not allowed, operation proceeds to step 345. If the flag or parameter indicates that exportation is allowed, operation proceeds to step 350.

In step 345, the token 104/device 106 communicates a response to the requesting universal token 102 indicating that the request has failed.

In step 350, the token 104/device 106 authenticates the requesting universal token 102. In an embodiment, token 104/device 106 authenticates the universal token 102 by validating the received digital certificate 234 for universal token 102. To validate the digital certificate, the token 104/device 106 obtains the public key of the certification authority which issued the certificate to universal token 102. The token 104/device 106 then uses the public key of the certification authority to verify the signature included with the digital certificate. If the signature is authentic, universal token 102 is successfully authenticated.

In an alternate embodiment, token 104/device 106 authenticates the requesting universal token 102 using a challenge/response protocol. For example, token 104/device 106 may issue a challenge to determine whether the universal token 102 has the appropriate level of security to store the authentication data of the token 104/device 106.

Figure 4:
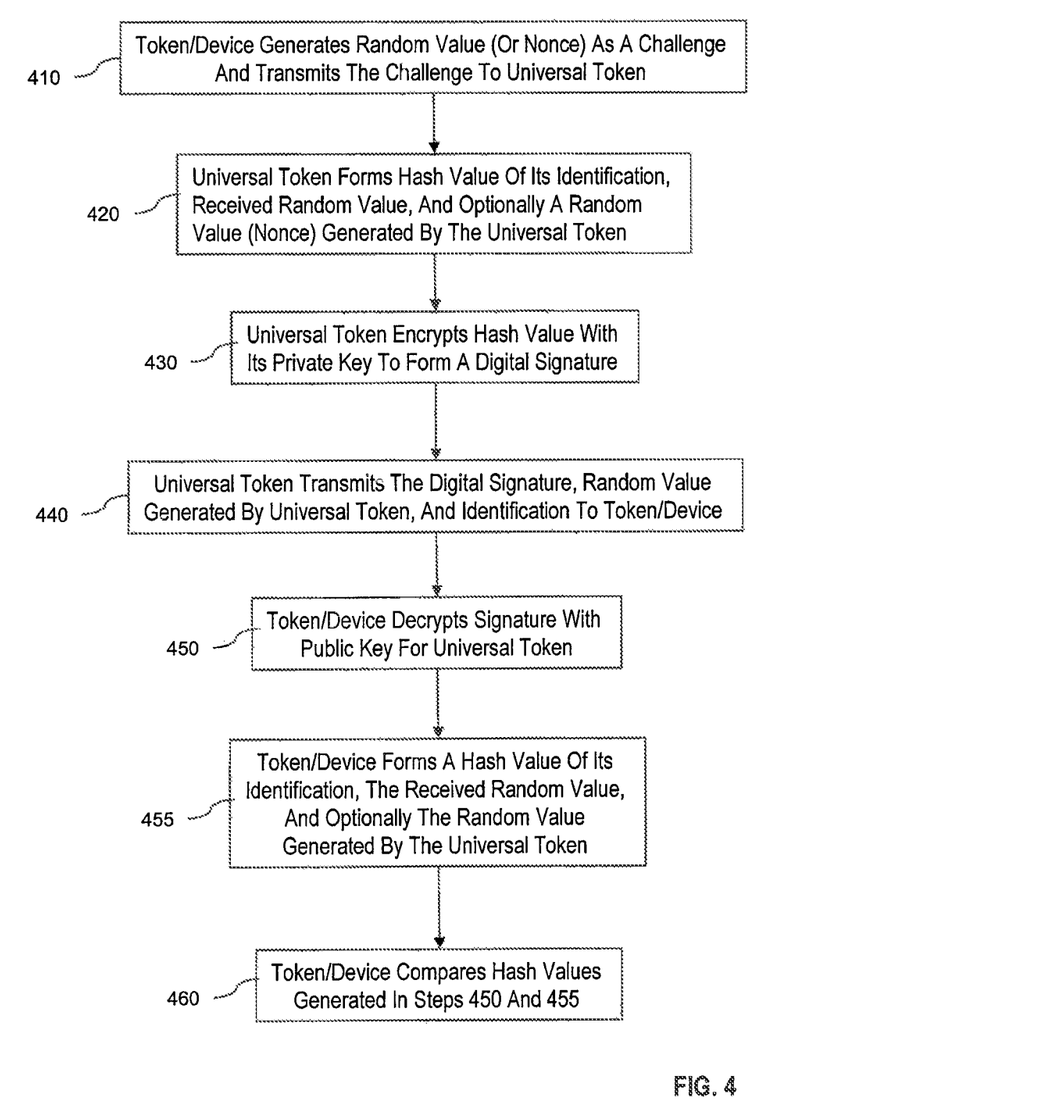
FIG. 4 depicts a flowchart of an exemplary certificate-based challenge/response protocol, according to embodiments of the present invention.

FIG. 4 depicts a flowchart 400 of an exemplary certificate-based challenge/response protocol, according to embodiments of the present invention. Flowchart 400 is described with continued reference to the exemplary operating environment depicted in FIG. 1 and the exemplary universal token 102 depicted in FIG. 2. However, flowchart 400 is not limited to these embodiments. Note that some of the steps in flowchart 400 do not necessarily have to occur in the order shown.

In step 410, the token 104/device 106 generates a random value (or nonce) as a challenge and transmits the challenge to universal token 102.

In step 420, universal token 102 forms a hash value of its identification, the received random value, and optionally a random value (or nonce) generated by universal token 102.

In step 430, universal token 102 encrypts the hash value with its private key to form a digital signature.

In step 440, universal token 102 transmits the digital signature, random value generated by the universal token 102 (token nonce), and identification to the token 104/device 106.

In step 450, the token 104/device 106 decrypts the signature with the public key for universal token 102. The public key may be transmitted to the token 104/device 102 in requesting step 330. Alternatively, the token 104/device 106 may obtain the public key from a public directory.

In step 455, token 104/device 106 forms a hash value of its identification, the generated random value, and optionally the token nonce. Steps 450 and 455 may occur substantially in parallel.

In step 460, token 104/device 106 compares the hash values generated in steps 450 and 455. If the two values match, the universal token 102 is successfully authenticated.

In some embodiments, token 104/device 106 may verify that universal token 102 is a secure device. In these embodiments, the manufacturer of the universal token 102 may issue a certificate (or include in the digital certificate) data that indicates the universal token was manufactured in a secure manner and has sufficient capabilities to securely maintain and use sensitive information. In additional embodiments, token 104/device 106 may verify that universal token has the appropriate security level to store the authentication data.

In an embodiment, a secure communications connection is established between the universal token 102 and the token 104/device 106.

Returning to FIG. 3, in step 360, token 104/device 106 authenticates the user of universal token 102. In this step, the token 104/device 106 insures that the user of universal token 102 is the user authorized for the resource whose authentication data is held by token 104/device 106. In an embodiment, token 104/device 106 does not transmit the authentication data for a user to the universal token 102 unless the user of the universal token is the same user associated with the authentication data in the token 104/device 106. Token 104/device 106 may further require verification that the user is currently in possession of the universal token 102 before transmitting authentication data. Note that step 360 is optional and may not be present in some embodiments.

Figure 5:
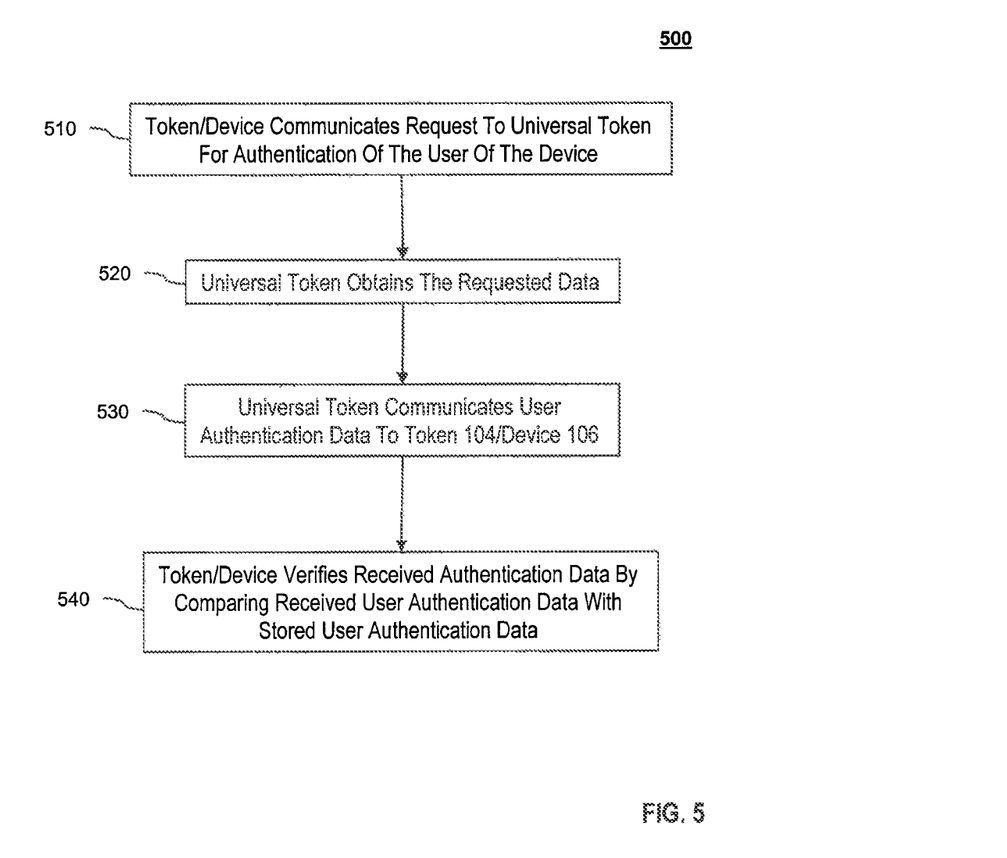
FIG. 5 depicts an exemplary flowchart of a method for authenticating the user of the universal token, according to embodiments of the present invention.

FIG. 5 depicts an exemplary flowchart 500 of a method for authenticating the user of universal token 102, according to embodiments of the invention. Flowchart 500 is described with continued reference to the exemplary operating environment depicted in FIG. 1 and the exemplary universal token 102 depicted in FIG. 2. However, flowchart 500 is not limited to these embodiments. Note that some of the steps in flowchart 500 do not necessarily have to occur in the order shown.

In step 510, token 104/device 106 communicates a request to universal token 102 for authentication of the user of the device. In an embodiment, token 104/device 106 requests a current biometric (e.g., fingerprint) scan of the user. In an alternate embodiment, token 104/device 106 may request a password, PIN, or a secret shared between the user and the token 104/device 106. As would be appreciated by persons of skill in the art, other forms of authentication information may be requested in this step.

In step 520, the universal token 102 obtains the requested data. For example, if biometric data is requested, universal token 102 prompts the user to initiate a biometric scan (e.g., fingerprint scan) via biometric authentication interface 250. The universal token 102 then converts the biometric scan data into a biometric template. In an embodiment, biometric template may be signed using the private key of the universal token 102 before it is sent. In a further example, if entry of a shared secret is requested, the universal token 102 may prompt the user to enter the shared secret.

In step 530, universal token 102 communicates the user authentication data to token 104/device 106. In an embodiment, a secure communication session is established. In an embodiment, the authentication data is encrypted prior to transmission using the private key of the universal token 102, a secret key established during a negotiation with the token 104/106, or some other cryptographic key. In an embodiment, the communication to the token 104/device 106 may include data indicating that the user authentication data is current. For example, the communication or alternatively the signed data, may include a time stamp, sequence number, or other similar form of information.

In step 540, token 104/device 106 verifies the received authentication data by comparing the received user authentication data with stored user authentication data. For example, the token 104/device 106 may compare a received biometric template or received secret with a biometric template or secret stored in the token 104/device 106 for the user. In addition, token 104/device 106 may verify the received authentication data is current (e.g., by checking the timestamp). Note that in step 540, the token 104/device 106 may also authenticate that the received authentication data came from the universal token 104 (and was not tampered with en route) by authenticating the received digital signature.

Returning to FIG. 3, if the authentication of the user was successful, in step 370, the token 104/device 106 transmits the requested authentication data for the user to universal token 102. The type of authentication data transmitted depends on the type of authentication used for the resource, application, or service to which the authentication data applies. For example, the authentication data may include one or more cryptographic keys and one or more current values that are being operated upon by a designated cryptographic algorithm. In an embodiment, the authentication data may also include an authentication algorithm.

In step 380, in the authentication record, the authentication data is stored in memory 210 of the universal token 102. The authentication data may be associated with a user, a provider, and/or a specific resource.

Although FIG. 3 describes the provisioning of data from one token 104 or device 106 into universal token 102, a person of skill in the art will recognize that multiple tokens and/or devices may be provisioned into a universal token 102 and that such provisioning may be performed sequentially or in parallel.

Figure 6:
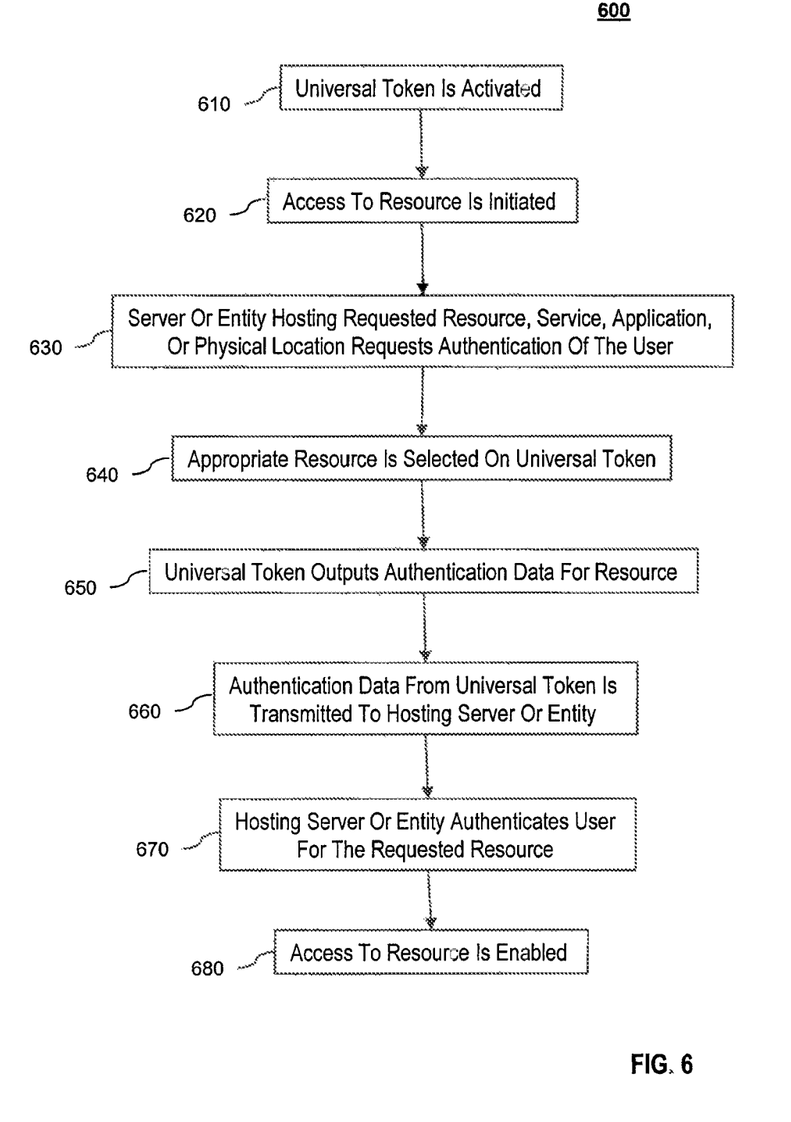
FIG. 6 depicts a flowchart of a method for using a universal authentication token, according to embodiments of the present invention.

FIG. 6 depicts a flowchart 600 of a method for using a universal authentication token, according to embodiments of the invention. Flowchart 600 is described with continued reference to the exemplary operating environment depicted in FIG. 1 and the exemplary universal authentication token depicted in FIG. 2. However, flowchart 600 is not limited to these embodiments. Note that some of the steps in flowchart 600 do not necessarily have to occur in the order shown.

As described above, prior to step 610, a user enrolls with a service provider, employer, building owner, etc. (referred to herein as "provider" for ease of description) for access to a specific resource, service, application, or physical location (referred to herein as "resource" for ease of description). In addition, prior to step 610, the user provisions a universal authentication token 102 with authentication data for multiple resources.

In step 610, universal token 102 is activated. This step is optional. In an embodiment, universal token 102 includes a biometric authentication interface 250. In this embodiment, a biometric template (e.g., fingerprint template) for the user may be stored in universal token 102. In order to activate universal token 102, a biometric scan of the user may be taken, a biometric template generated, and compared with a stored biometric template. If the templates match, the universal token 102 is activated. In addition or alternatively, the user may be asked to enter a password or PIN to activate the universal token.

In step 620, access to a resource is initiated. For example, a user may initiate log-in procedures to a website for a financial account. In a further example, a user may attempt to remotely access computer resources for his/her employer. In another example, a user may attempt to gain access to a restricted area of a building. Access may be initiated via any device including, but not limited to, a personal computer, wireless phone, PDA, personal entertainment device, or specialized terminal or device.

In step 630, the server or entity hosting the requested resource requests authentication.

In step 640, the appropriate resource is selected on the universal token 102. In an embodiment, the universal token 102 presents a list of the resources associated with the user on a display. The user then selects the appropriate resource from the list. Alternatively, the user may set a switch, press a key, scroll through a menu, etc. to select the appropriate resource. In addition or alternatively, universal token 102 automatically selects the appropriate resource based on information received from the hosting server or entity.

In step 650, universal token 102 outputs the authentication data for the resource. In an embodiment, universal token 102 uses the stored authentication data in conjunction with an authentication algorithm in secure processor to generate the authentication data for output. Universal token 102 may output the authentication data to a reader in an access device, as described above (e.g., via a contactless or contact-based interface). In addition or alternatively, universal token 102 may display the authentication data. The user then manually enters the authentication data into an access device.

In an embodiment, universal token 102 outputs the authentication data in encrypted form. For example, secure processor 260 may use the private key of universal token 102 or another key installed in the device when it was manufactured or configured to encrypt the authentication data. Note that the receiving server must have the complementary key or keys (e.g., public key of universal token 102) to decrypt the authentication data upon receipt.

In step 660, the authentication data from the universal token 102 is transmitted to the hosting server or entity. In an embodiment, additional authentication data is provided to the server in this step (e.g., login/password). In this way, the universal token may provide a portion of the authentication in a multi-factor authentication system.

In step 670, the hosting server or entity authenticates the user for the requested resource. For example, the user may be authenticated via cryptographic techniques.

If the user is successfully authenticated, access to the resource is enabled in step 680.

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A wireless device with an embedded universal authentication token, comprising:
    a secure processor configured to cryptographically authenticate the universal authentication token, using a certificate or a key, and a user of the universal authentication token to an authentication information storage device;
    a wireless communications interface configured to receive authentication data from the authentication information storage device if the universal authentication token and the user of the universal authentication token are successfully authenticated to the authentication information storage device, wherein the authentication data includes a key;
    a memory configured to store in a security boundary established by the secure processor a resource authentication record that includes the received authentication data; and
    a near field communication interface configured to transmit the authentication data included in the resource authentication record or data generated based on the authentication data included in the resource authentication record to an access device to access a resource.

2. The wireless device of claim 1, wherein the authentication data includes a credit card number or credit card information.

3. The wireless device of claim 1, wherein the universal authentication token is configured to automatically select the resource authentication record stored in the memory to access the resource.

4. The wireless device of claim 3, wherein the universal authentication token is configured to automatically select the resource authentication record based on information received from the access device.

5. The wireless device of claim 1, further comprising:
    a user interface configured to present a list of resource authentication records stored in the memory and to receive a selection for the resource authentication record from the list.

6. The wireless device of claim 1, further comprising:
    a user interface configured to present a button, link, or menu for initiating a request to the authentication information storage device for the authentication data.

7. The wireless device of claim 1, further comprising:
    a biometric authentication module configured to control access to the universal authentication token.

8. The wireless device of claim 1, further comprising:
    a biometric authentication module configured to authenticate the user of the universal authentication token.

9. The wireless device of claim 1, wherein the secure processor is configured to cryptographically authenticate the user of the universal authentication token to the authentication information storage device using a password.

10. The wireless device of claim 1, wherein the secure processor is configured to cryptographically authenticate the user of the universal authentication token to the authentication information storage device using a PIN.

11. The wireless device of claim 1, wherein the secure processor is configured to cryptographically authenticate the user of the universal authentication token to the authentication information storage device using a shared secret.

12. The wireless device of claim 1, wherein the wireless device is configured to receive a password or PIN before granting access to the resource authentication record stored in the memory.

13. The wireless device of claim 1, wherein the wireless device is a phone.

14. A method for provisioning and using a universal authentication token embedded in a wireless device, the method comprising:
    cryptographically authenticating the universal authentication token, using a certificate or a key, and a user of the universal authentication token to an authentication information storage device;
    wirelessly receiving authentication data from the authentication information storage device if the universal authentication token and the user of the universal authentication token are successfully authenticated to the authentication information storage device, wherein the authentication data includes a key;
    storing in a security boundary established by the secure processor a resource authentication record that includes the received authentication data; and
    transmitting the authentication data included in the resource authentication record or data generated based on the authentication data included in the resource authentication record to an access device to access a resource.

15. The method of claim 14, wherein the authentication data includes a credit card number or credit card information.

16. The method of claim 14, further comprising:
    automatically selecting the resource authentication record stored in the security boundary to access the resource.

17. The method of claim 14, further comprising:
    presenting a list of resource authentication records stored in the security boundary on a user interface; and receiving, via the user interface, a selection for the resource authentication record from the list.

18. The method of claim 14, wherein the wireless device is a phone.

19. The method claim 14, wherein the user of the universal authentication token is cryptographically authenticated to the access device using a password.

20. The method claim 14, wherein the user of the universal authentication token is cryptographically authenticated to the access device using a PIN.

* * * * *